May 22, 1928.
G. POPPS
1,670,902
PIPE AND CABLE HANGER
Filed Oct. 16, 1924
2 Sheets-Sheet 1
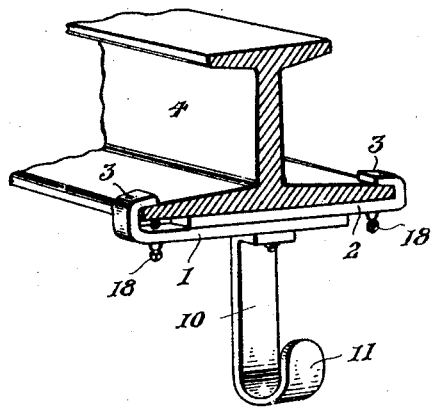
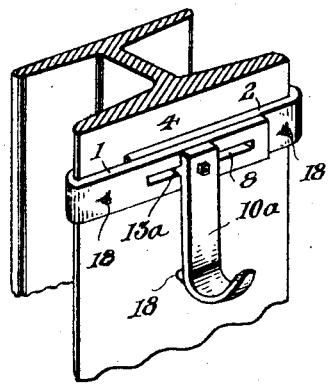
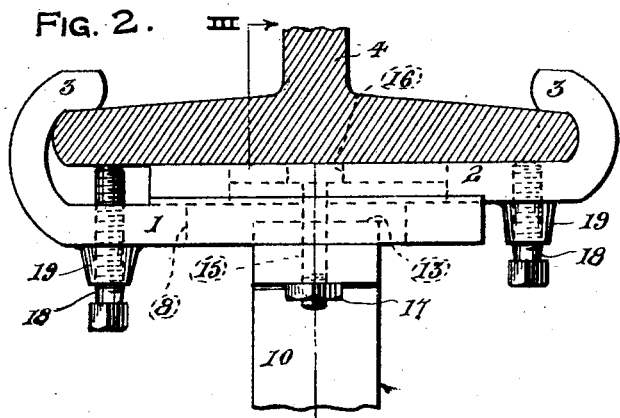
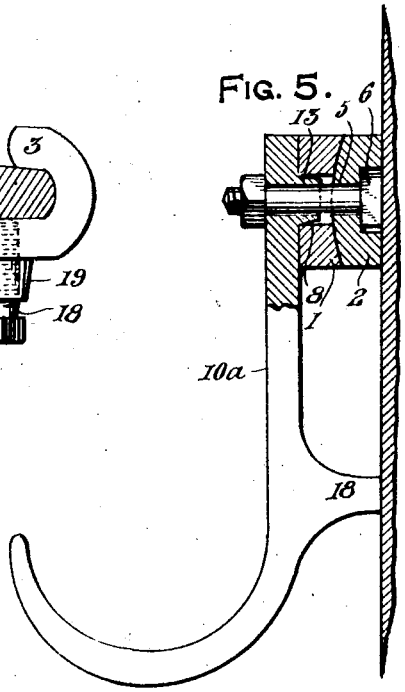
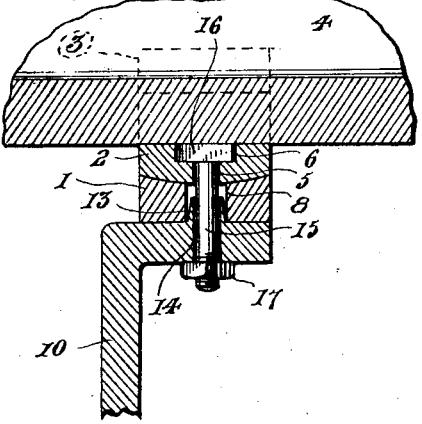
Inventor
G. Popps
By Bryant & Lowry
Attorneys May 22, 1928. 1,670,902
G. POPPS
PIPE AND CABLE HANGER
Filed Oct. 16, 1924 2 Sheets-Sheet 2
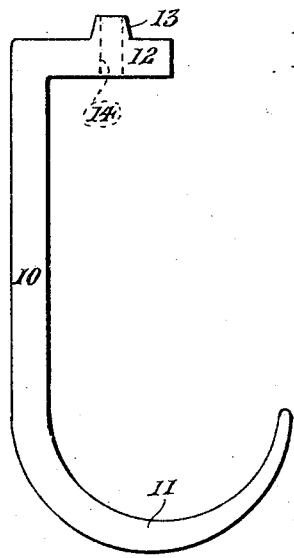
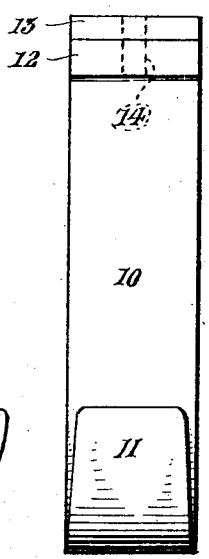
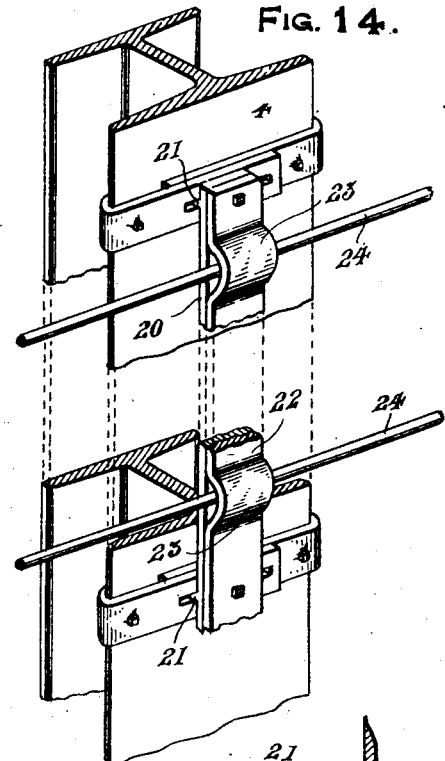
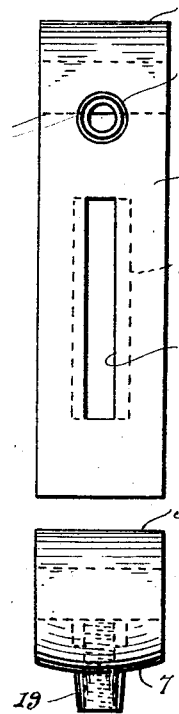
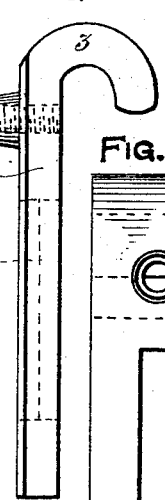
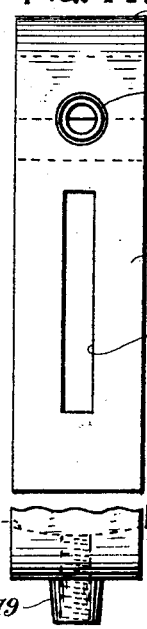
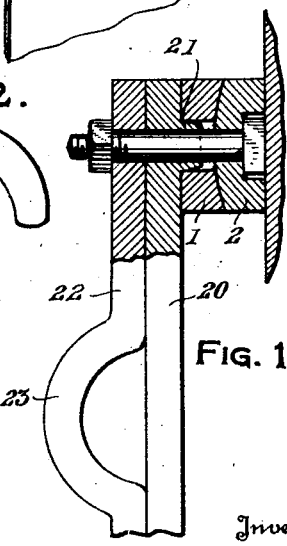
Inventor
G. Popps
By Bryant & Lowry
Attorneys Patented May 22, 1928.

1,670,902

UNITED STATES PATENT OFFICE.

GEORGE POPPS, OF MASSENA, NEW YORK.

PIPE AND CABLE HANGER.

Application filed October 16, 1924. Serial No. 744,005.

This invention relates to certain new and useful improvements in pipe and cable hangers and has for one of its objects to provide a hanger for pipes or cables wherein the same is capable of being supported upon horizontal or vertical beam structures or the like with pipes or cables securely supported or anchored therein.

A further object of the invention is to provide a pipe and cable hanger wherein a pair of clamping arms are adjustable to accommodate the mounting thereof upon supports of different sizes and with the contacting faces of the overlapping clamping arms being of arcuate formation at right angles to the longitudinal axes thereof to prevent lateral movement of the clamping arms when the same are in assembled positions.

A still further object of the invention is to provide a pipe and cable hanger wherein a pair of interengaging clamping arms are adapted to be secured to a supporting structure and further including a supporting bracket for pipes or cables that has an interlocking connection with the clamping arm for rigidly holding the same in set position.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a perspective view of a pipe hanger constructed in accordance with the present invention, the same being illustrated as mounted upon a horizontal I-beam, Figure 2 is a front elevational view of the hanger with the supporting horizontal I-beam shown in section and a portion of the hanger bracket broken away, Figure 3 is a detail sectional view taken on line III—III of Fig. 2 showing the interlocking connection between the hanger bracket and clamping arms and the engaging arcuate faces of the clamping arms, Figure 4 is a perspective view of the hanger illustrated as mounted upon a vertical supporting beam structure, Figure 5 is a detail sectional view of the hanger shown in Fig. 4 illustrating the extension brace or support carried by the hanger bracket, Figures 6 and 7 show side and front elevational views of the hanger bracket, Figures 8, 9 and 10 show front, side and end elevational views respectively of one of the clamping arms of the hanger, Figures 11, 12, and 13 show front, side and end elevational views respectively of the other clamping arm, Figure 14 is a perspective view of the hanger adapted for supporting cables or the like, and Figure 15 is a detail sectional view of the hanger shown in Fig. 14.

Referring more in detail to the accompanying drawings, and particularly to Figs. 1 to 3 inclusive and Figs. 6 to 12 inclusive, there is illustrated a pipe hanger adapted for mounting upon a horizontal beam structure for supporting horizontal pipes or the like and includes a pair of extensible clamping arms 1 and 2 that overlie each other and provided with hook extensions 3 upon the outer ends that engage the opposite sides of the lower flange of the I-beam 4.

The connection between the clamping arms 1 and 2 includes the provision of a longitudinally extending slotted opening 5 in the clamping arm 2 that is enlarged as at 6 at the upper side of the clamping arm, while the lower face of the clamping arm 2 is outwardly arched or transversely curved as at 7 to provide a convex face. The clamping arm 1 is provided with a longitudinally extending slotted opening 8 that registers with the opening 5 in the clamping arm 2 and the upper face of the clamping arm 1 that engages the outer or lower face 7 of the clamping arm 2 is concaved as at 9 so that when the clamping arms 1 and 2 are assembled as illustrated in Figs. 1 to 3, relative rotary or swinging movements thereof will be prevented. The curved contacting faces of the arms 1 and 2 extend a sufficient distance longitudinally of the arms so that the meeting faces of the arms present curved contacting faces when assembled in different relative positions with the hook ends 3 of the arms different distances from each other. It will be observed from an inspection of Fig. 2 that the curved faces of the clamping arms are of a length equal to the length of overlapping adjustment of the clamping arms, this idea being indicated by dotted lines in said figure. When the clamping arms are assembled with the transversely curved faces thereof contacting, it will at once be evident that relative twisting movements thereof will be prevented when the arms are clamped together and assembled in a manner to be described.

The hanger bracket illustrated in detail in Figs. 6 and 7 is associated with the clamping arms 1 and 2 and includes a vertical leg 10 provided with a pipe supporting arm or hook 11 at its lower end and carrying a right angularly extending arm 12 at the upper end thereof that overlies the lower hook 11. The upper face of the arm 12 carries a transversely extending upstanding rib 13 and a vertical bolt receiving opening 14 is formed in the arm 12 and rib 13 as clearly illustrated. The arm 12 is placed in flat engagement with the lower flat face of the clamping arm 1 and the upstanding rib 13 extends into the slotted opening 8 as clearly shown in Figs. 2 and 3 to form an interlocking connection between these parts. A bolt 13 has the rectangular head 16 thereof seated in the enlargement 6 at the upper side of the clamping arm 2, while the shank of the bolt 15 extends thru the slotted openings 5 and 8 and the opening 14 with the nut 17 threaded upon the lower end thereof for securely clamping the arms 1 and 2, and the hanger bracket 10 together. The clamping arms 1 and 2 are further anchored to the supporting I-beam 4 by stud bolts 18 that are threaded thru apertured bearing bosses 19 depending from the clamping arms for engaging the lower face of the base flange of the I-beam as clearly illustrated in Fig. 2.

It will therefore be seen that lateral twisting movement of the clamping arms 1 and 2 will be prevented by the engaging arcuate faces thereof while rotary movement of the hanger bracket 10 relative to the clamping arms is prevented by the interlocking connection afforded by the rear projection 13 upon the hanger bracket extending into the slotted opening 8 of the clamping arm 1, the clamping arms 1 and 2 being adjustable for engaging I-beams or other supporting devices of different dimensions and securely anchored thereto by the stud screws 18 as will be clearly evident from an inspection of Fig. 2.

When it is desired to mount the hanger upon a vertical support as illustrated in Figs. 4 and 5, the construction remains substantially the same with the exception that the angularly extending arms 12 upon the bracket hanger are eliminated and the outer face of the upper end of the bracket hanger 10ª is placed in flat engagement with the outer face of the clamping arm 1 while a leg extension 18 carried by the hanger bracket 10ª engages the supporting beam 4 to hold the bracket properly spaced therefrom. It will be seen from a close inspection of Fig. 4 that the hanger bracket 10ª carries a rib extension 13ª that projects into the slotted opening 8 of the clamping arm 1 to prevent swinging movement of the hanger bracket relative to the clamping arm.

In the form of the invention illustrated in Figs. 14 and 15, the clamping arms 1 and 2 are of identical construction with the clamping arms illustrated in Figs. 8 to 13 and devices are associated with the clamping arms for supporting cables or the like in banks of horizontal or vertical arrangement. The strip 20 carries rib extensions 21 upon one face thereof that project into the slotted opening 8 of the clamping arms 1 and a strip 22 is placed in flat engagement with the outer face of the strip 20 and is retained in assembled position relative thereto by securing bolts 15 similarly to the mounting of the hanger bracket 10 shown in Fig. 3. The outer clamping strip 22 is provided with offset portions 23 that receive cables 24 or the like for supporting the same between the two clamping strips 20 and 22.

While there are herein shown and described the preferred embodiments of the present invention, it is nevertheless to be understood that minor changes may be made therein without departing from the spirit and scope of the invention as claimed.

What is claimed as new is:—

In a pipe and cable hanger, a pair of clamping arms adapted for clamping engagement with a support and provided with registering elongated slots, the meeting faces of the clamping arms being formed on an arc at right angles to the longitudinal axes of the arms, the arcuate faces extending the full length of the overlapping portions, a hanger bracket associated with the clamping arms, a rib carried by the bracket and extending into the slot of one clamping arm, there being an opening thru the bracket and rib registering with the arm slots and a bolt passing thru the registering openings for holding the parts assembled.

In testimony whereof I affix my signature.

GEORGE POPPS.